United States Patent
McNulty, Jr.

(10) Patent No.: US 6,264,740 B1
(45) Date of Patent: Jul. 24, 2001

(54) INORGANIC CEMENTITIOUS MATERIAL

(76) Inventor: William J. McNulty, Jr., P.O. Box 672, Provo (TC)

( * ) Notice: Subject to any disclaimer, the term of this patent is extended or adjusted under 35 U.S.C. 154(b) by 0 days.

(21) Appl. No.: 09/456,841

(22) Filed: Dec. 7, 1999

Related U.S. Application Data

(60) Provisional application No. 60/111,441, filed on Dec. 8, 1998.

(51) Int. Cl.[7] .......................... C04B 7/345; C04B 12/00; C04B 22/10
(52) U.S. Cl. .......................... 106/817; 106/638; 106/640; 106/705; 106/711; 106/712; 106/772; 106/789; 106/792; 106/801; 106/802; 106/811; 106/813; 106/814; 106/815; 106/819; 106/823; 423/420.2; 264/333
(58) Field of Search ........................... 106/712, 817, 106/638, 640, 643, 705, 711, 772, 773, 775, 776, 778, 780, 782, 783, 788, 789, 790, 791, 792, 793, 794, 795, 798, 799, 801, 802, 803, 804, 805, 806, 807, 808, 809, 810, 811, 812, 813, 814, 815, 819, 823; 423/420.2

(56) References Cited

U.S. PATENT DOCUMENTS

| 132,973 | 12/1872 | McKay | 106/811 |
|---|---|---|---|
| 474,529 | 5/1892 | Roller | 149/7 |
| 603,226 | 4/1898 | Sturcke | 423/165 |
| 802,657 | 10/1905 | Pennock | 106/464 |
| 1,379,157 | 5/1921 | Alton | 423/160 |
| 1,552,024 | 9/1925 | Alton | 423/432 |
| 1,587,679 | 6/1926 | Richter et al. | 423/161 |
| 3,819,389 | 6/1974 | Uchikawa et al. | 106/734 |
| 3,859,105 | 1/1975 | Feder | 106/792 |
| 3,893,841 | 7/1975 | Nijhawan et al. | 106/705 |
| 4,264,367 | 4/1981 | Schutz | 106/728 |
| 4,306,912 | 12/1981 | Forss | 106/702 |
| 4,338,134 | 7/1982 | Graf zu Munster | 588/257 |
| 4,444,593 | 4/1984 | Schutz | 106/692 |
| 4,650,523 | 3/1987 | Kikuchi et al. | 106/819 |
| 4,798,628 | 1/1989 | Mills et al. | 106/692 |
| 4,997,484 | 3/1991 | Gravitt et al. | 106/708 |
| 5,160,376 | 11/1992 | Kikuchi et al. | 106/819 |
| 5,194,087 | 3/1993 | Berg | 106/18.12 |
| 5,647,902 | 7/1997 | Wu | 106/464 |
| 5,728,428 | 3/1998 | Rusinoff | 427/292 |

OTHER PUBLICATIONS

Limes and Cements, Chapter 1, Progress of Discovery in the Science Connected with Limes, etc., pp. 1–9 (no date).
Artificial Hydraulic Lime, p. 47 (no date).
The Plaster Cements, Flooring Plasters, p. 117 (no date).
The Technology of Cement and Concrete, Chapter 1, Introductory, Article 1, Historical, pp. 3–5 (no date).
Ancient Egyptian Literature, p. 94–103 (no date).
Derwent Abstract No. 1995–246975, Jul. 13, 1994, abstract of Chinese Patent Specification No. 1089322.
Japanese Patent Abstracts, Abstract No. JP409104865A, Apr. 22, 1997, abstract of Japanese Patent Specification No. 09–104865.
Japanese Patent Abstract No. JP409078063A, Mar. 25, 1997, abstract of Japanese Patent Specification No. 09–078063.

*Primary Examiner*—Anthony Green
(74) *Attorney, Agent, or Firm*—Stevens, Davis, Miller & Mosher, LLP

(57) ABSTRACT

A method of producing a new type of cement, hereafter called Conch-krete. Conch-krete is created by adding sodium carbonate (also known as soda ash, natron, etc.) and one or more minerals from the calcium carbonate group (including aragonite, limestone, calcite, marble, dolomite, etc.) and the addition of water to the mix that will harden into a cement-like material. The combination of sodium carbonate and calcium carbonate can be either layered or in a mixed state. An exothermic reaction starts after the addition of water. The composition of Conch-krete can vary between 20% sodium carbonate and 80% calcium carbonate to 80% sodium carbonate and 20% calcium carbonate. Conch-Icrete can be used in a variety of applications not inclusive of forming bricks, interior architecture, table or counter tops, ornaments, repairing damaged cement products, casting and other applications not mentioned above.

21 Claims, No Drawings

INORGANIC CEMENTITIOUS MATERIAL

CROSS-REFERENCE TO RELATED APPLICATIONS

This application claims the benefit of U.S. Provisional Serial No. 60/111,441, filed Dec. 8, 1998.

BACKGROUND OF THE INVENTION

1. Field of the Invention

This invention relates to a new form of inorganic cementitious material which finds utility as a binder for aggregate. The invention also relates to a method of forming the cementitious material by mixing an inorganic material with either fresh or seawater, creating an exothermic reaction by which the inorganic material hardens. In some instances, aggregate is added prior to, subsequent to, or simultaneous with the addition of water to create a concrete-like material.

2. Description of the Related Art

Hydraulic cements are known, the most widely encountered being Portland Cement, in which an inorganic material is heat treated at high temperatures, generally in a kiln, to activate the cement. When subsequently mixed with water, this cement hardens. When aggregate is added to the cement, it is generally known as concrete.

The invention relates to a new type of cementitious material formed of inorganic substances that do not require the high temperature heat treatment associated with Portland Cement.

Ancient Egyptians described using block or mud brick to build many structures, such as scenes of mud bricking in the Rehkmire tomb at Sheikh abd el-Qurna area of Egypt. Other formulas for making structures or casting are detailed on the Famine Stele located on the island of Sehel, Egypt.

However, abandonment of this process would be applicable if this prior art does describe the use of a cementitious material created by adding sodium carbonate (also known as soda ash, natron, etc.) and one or more materials for the calcium carbonate group (including aragonite, limestone, calcite, marble, dolomite, etc.) which when mixed with water will harden. I have named this new type of cement Conch-krete.

The strength and final set of the product of this process depend on the combination of sodium carbonate, calcium carbonate and water. To achieve a long lasting set, additional water needs to be available to the product after the initial set, as the product absorbs water after the initial set that will increase the length of the set.

SUMMARY OF THE INVENTION

It is thus an object of the invention to provide a new type of inorganic cementitious material that will harden upon addition of water.

It is a further object of the invention to provide methods of using this new cementitious material as a binder for aggregate, to make bricks, blocks, cast stonework, cultured marble, retaining walls, pipe, grout, mortar, gunnite, stucco and similar or other products.

These and other objects of the invention will be more fully understood in connection with the detailed description of the embodiments of the invention.

DESCRIPTION OF THE PREFERRED EMBODIMENTS

In one embodiment, a cementitious material is formed by mixing a source of sodium carbonate with a calcium carbonate material, adding water and inducing an exothermic reaction to harden the cement. The amounts of components can vary between 20 and 80 wt % sodium carbonate to 80–20 wt % calcium carbonate as active ingredients.

The sodium carbonate can be in the form of sodium carbonate or as sodium carbonate dehydrate, sodium carbonate anhydrous, etc.

As sources of sodium carbonate can be natural soda ash, natron, etc. Sources of calcium carbonate include calcium carbonate or as one of the known forms or a source as aragonite, limestone, calcite, marble, dolomite, etc.

When water is added to the mixture of inorganic materials hardening generally starts quickly.

The fineness and grain size of the calcium carbonate and sodium carbonate components not only affects the overall appearance of the final product, but also its strength.

The calcium carbonate and sodium carbonate used in the invention can vary in particle size from that of powder, common sand, to dust, chips, clumps, or larger chunks of material. The particle size will normally be selected for the effect to be achieved in the finished product, and mixtures of particle sizes can be used in combination.

A coloring agent or dye may be introduced at the time of mixing the ingredients of the cementitious material of the invention that will affect the final color of the resulting product, thereby allowing the ability to individually tailor the final appearance of the cementitious products. The following is a list of mineral and compounds that can be added to the cement mixture (under 5% by weight of the cement) that woll enhance the final product: halides, sodium chloride, borates, oxides, phosphates, silicates, sulfates, sulfides, fly ash, silica fume, sand, pozzolans, mastics, thermoplastics, thermosetting elastomes, epoxy, polyurethane, polysulfide, silicones, polysulfide coal tars, thermosetting sealants, neoprene, butyl-rubber, lead, rubber, asphalt, rubber coal tar, acrylic, vibyl, oleo-resins, polybutene, carbon, steel, stainless steel, steel, copper, flurosilicates, free lime, hydrated lime, chlorinated rubber, bentonite, micro-silicas, metakaolin, wollastonite, magnesium carbonate, silicon dioxide, copper salts, iron, iron oxide, potash, potassium carnonate, superplasticizers, bitumen, synthetic fibers, straw, slag, glass fibers, galvanized steel, cellulose ethers, sulfonated copolymers, aluminum, aluminum salts, carbon, sulfuric acid, magnesium, salts, thiocyanuric acids, alkanolamide, rhodanides, urea, aldehydes, monomethylolurea, triisopropanolamine, metal nitrates, metal thiocyanates, thiosulfates, thriethanolamine, gluconic acid, lignosulfonic acid, sodium nitrite, calcium formate, sodium benzoate, formaldehyde, silicoaluminates, geopolymeric binders, zeolites, polyacrylates, geopolymers, ammonium salts, calcium oxide, borax, potassium hydroxide, potassiumm carbonate, sodium hydroxide, citric acid, carnoxylic acid, lignosulfate, gypsum dihydrate, gupsum hemihudrate, anhudrous gypsum, bicarbonate, hudrogen peroxide, boric acid, lithium, lithium carbonate, calcium sulfate, alkali bicarnbonate, sufonated lignin, lignosulfonates, fluoride, tricalcium silicates, tricalcium aluminate, chromium oxide, wood, natural fibers, synthetic textile fibers, anhydrite, titanium, sandstone, rhyolites, volcanic ash, dolomite, thiocyanates, calcium nitrite and air-entraining admixtures, hydrogen sufide, iron sufide, ferrous sulfide, sulfur; magnesium silicate.

As noted above, the resulting cementitious material can be employed as a filler, grout, mortar, gunnite, masonry, bricks or blocks, decorative effect, architectural or cast stonework, ornamental or cultured marble or granite, retaining walls, wall claddings, paneling, counter panels, roof and floor tiles, pavers, precast stone, cobblestones and agglomerated stones, pipe, reinforced, including prestressed, concrete products, extruded and molded products and composites. It can be used as insulated sheathing, thermal insulation, packing material and in housewares and appliances. It may be used as a component of canoes, boats, kayaks, temporary casts, table or countertops, bioabsorbable devices, etc. alone or with other materials. It also finds utility as temporary fillings, temporary roads, temporary facilities, temporary shoring, temporary barriers, temporary support, temporary scaffolding, temporary walls, temporary docks, etc.

Aggregates which can be included within the cement include bedrock, traprock, quartz and quartzites, granite, chyrscolla, malachite, biotite and feldspar.

It may be formed of a mixed homogeneous material or may take the form of a layered mix.

It is to be understood that variations and improvements may be made to the invention without departing from the spirit and scope of the appended claims.

I claim:

1. A cementitious product formed by reacting an uncalcined cementitious mixture consisting of a source of sodium carbonate and a source of calcium carbonate and water, wherein the sodium carbonate content is from 20 to 80 wt % and the calcium carbonate content is from 80 to 20 wt % and water is present in an amount sufficient to harden the cementitious product.

2. The cementitious product of claim 1, wherein the source of calcium carbonate includes at least one material selected from the group consisting of calcium carbonate, aragonite, limestone, calcite, marble and dolomite.

3. The cementitious product of claim 1, wherein said reaction is exothermic created between said water and said cementitious mixture in the presence or absence of a hardener.

4. The cementitious product of claim 1, wherein the source of calcium carbonate is present in the form of a material selected from the group consisting of powder, dust, sand, clumps and combinations thereof.

5. The cementitious product of claim 1, wherein the source of sodium carbonate is present in the form of a material selected from the group consisting of powder, dust, sand, clumps and combinations thereof.

6. The cementitious product according to claim 1 in hardened form.

7. The cementitious product of claim 1, wherein said sodium carbonate and calcium carbonate appear as layers in said product.

8. A soled product comprising at least one aggregate selected from the group consisting of bedrock, traprock, quartz, quarzite, granite, marble, limestone, dolomite, sandstone, chyrsocolla, malachite, biotite and feldspar bonded with the cementitious product of claim 1.

9. A method of forming a cementitious product comprising:
   providing a mixture of a source of 20 to 80 wt % calcium carbonate and 80 to 20 wt % sodium carbonate in uncalcined form, mixing with water in the presence or absence of aggregate;
   inducing an exothermic reaction in the resulting mixture, and recovering a hardened product.

10. The method of claim 7, further comprising adding a coloring agent or dye to the cementitious product.

11. The method of claim 9, wherein the method further includes shaping the mixture prior to hardening thereof.

12. The method of claim 9, wherein the exothermic reaction is induced in the presence or absence of a hardener.

13. The method of claim 9, wherein the product is at least one selected from the group consisting of filler, grout, mortar, gunnite, stucco, masonry, decorative or architectural stonework, bricks, blocks, roof or floor tiles, cobblestones and pavers.

14. The method of claim 9, wherein the product is at least one selected from the group consisting of cultured marble, paneling, retaining walls, wall claddings, counter panels, flooring masonry, pipe, reinforced concrete and pre-stressed concrete.

15. The method of claim 9, wherein the water is fresh water or seawater.

16. The method of claim 9, wherein the mixture further includes adding up to 5 wt % of a synthetic resin.

17. The method of claim 9, wherein the mixture further includes adding at least one morganic additive to the mixture.

18. The method of claim 9, wherein said forming includes the step of shaping the cementitious product by at least one shaping step selected from the group consisting of molding, spraying and casting.

19. The method of claim 9, further comprising adding an air-entraining admixture in an amount of up to 5 wt % of the cementitious product.

20. The method of claim 9, wherein the mixture further includes adding at least one organic additive to the mixture.

21. The method of claim 9, further comprising adding up to 5 wt % of at least one substance selected from the group consisting of halides, sodium chloride, borates, oxides, phosphates, silicates, sulfates, sulfides, fly ash, silica fume, sand, pozzolans, mastics, thermoplastics, thermosetting elastomers, epoxy, polyurethane, polysulfides, silicones, polysulfide coal tars, thermosetting sealants, neoprene, butyl-rubber, lead, rubber, asphalt, rubber coal tar, acrylic, vinyl, oleo-resins, polybutene, carbon steel, stainless steel, steel, copper, flurosilicates, free lime, hydrated lime, chlorinated rubber, bentonite, micro-silicas, metakaolin, wollastonite, magnesium corbonate, silicon dioxode, copper salts, iron, iron oxide, potash, potassium carbonate, superplasticizers, bitumen, synthetic fibers, straw, slag, glass fibers, galvanized steel, cellulose ethers, sulfonated copolymers, aluminum, aluminum salts, carbon, sulfuric acid, magnesium, magnesium salts, thiocyanic acids, alkanolamine, rhodanides, urea, aldehydes, monomethylolurea, triisopropanolamine, metal nitrates, metal thiocyanates, thiosulfates, triethanolamine, gluconic acid, lignosulfonic acid, sodium nitrite, calcium formate, sodium benzoate, formaldehyde, silicoaluminates, geopolymeric binders, zeolites, polyacrylates, geopolymers, ammonium salts, calcium oxide, borax, potassium hydroxide, potassium carbonate, sodium hydroxide, citric acid, carboxylic acid, lignosulfate, gypsum dihydrate, gypsum hemihydrate, anhydrous gypsum, sodium bicarbonate, hydrogen peroxide, boric acid, lithium, lithium carbonate, calcium sulfate, alkali bicarbonate, sulfonated lignin, lignofulfonates, fluoride, tricalcium silicates, tricalcium aluminate, chromium oxide, wood, natural fibers, synthetic textile fibers, anhydrite, titanium, sandstone, rhyolites, volcanic ash, dolomite, thiocyanates, calcium nitrite and air-entraining admixtures, hydrogen sulfide, iron sulfide, ferrous sulfide, sulfur and magnesium silicate.

* * * * *

UNITED STATES PATENT AND TRADEMARK OFFICE
CERTIFICATE OF CORRECTION

PATENT NO. : 6,264,740 B1
DATED : July 24, 2001
INVENTOR(S) : William J. McNulty, Jr.

It is certified that error appears in the above-identified patent and that said Letters Patent is hereby corrected as shown below:

<u>Title page,</u>
ABSTRACT,
Line 13, "Conch-Icrete" should be -- Conch-krete --.

<u>Column 1,</u>
Line 8, "Rehkmire" should be -- Rekhmire --.

<u>Column 2,</u>
Line 3, "20 and 80" should be -- 20 to 80 --.
Line 3, "carbonate to 80-20" should be -- carbonate and 80 to 20 --.
Line 5, "dehydrate" should be -- decahydrate --.
Line 29, "magnesium, salts" should be -- magnesium salts --.
Line 31,"woll" should be -- will --.
Line 34, "potassiumm" should be -- potassium --.
Line 34, "carnoxylic" should be -- carboxylic --.
Line 34, "elastomes" should be -- elastomers --.
Line 35, "gupsum hemihudrate" should be -- gypsum hemihydrate --.
Line 35, "anhudrous" should be -- anhydrous --.
Line 35, "hudrogen" should be -- hydrogen --.
Line 36, "bicarnbonate" should be -- bicarbonate --.
Line 36, "sufonated" should be -- sulfonated --.
Line 37, "viby" should be -- vinyl --.
Line 38, "dolomite" should be -- dolerite --
Line 39, "hydrogen sufide" should read -- hydrogen sulfide --.
Line 39, "iron sufide" should be -- iron sulfide --.
Line 42, "carnonate" should be -- carbonate --.
Line 51, "chyrscolla" should be -- chryscolla --.

<u>Column 3,</u>
Line 1, "soled product" should be -- solid product --.
Line 1, "quarzite" should be -- quartzite --; "chyrscolla" should be -- chryscolla --.
Line 1, "claim 7" should be -- claim 9 --.

UNITED STATES PATENT AND TRADEMARK OFFICE
CERTIFICATE OF CORRECTION

PATENT NO.    : 6,264,740 B1
DATED         : July 24, 2001
INVENTOR(S)   : William J. McNulty, Jr.

It is certified that error appears in the above-identified patent and that said Letters Patent is hereby corrected as shown below:

<u>Column 4,</u>
Line 2, "morganic" should be -- inorganic --.
Line 14, "corbonate" should be -- carbonate --.
Line 63, "dolomite" should be -- dolerite --.

Signed and Sealed this

Thirtieth Day of July, 2002

Attest:

Attesting Officer

JAMES E. ROGAN
*Director of the United States Patent and Trademark Office*